INVENTORS
MARCEL DENIS
PIERRE PALLUEL
By:
Haseltine, Lake & Co.
AGENTS

Aug. 12, 1952

M. DENIS ET AL

PHASE SHIFTER 2,607,031

Filed June 2, 1950

2 SHEETS—SHEET 2

INVENTORS
MARCEL DENIS
PIERRE PALLUEL
By: Haseltine, Lake & Co.
AGENTS

Patented Aug. 12, 1952 2,607,031

UNITED STATES PATENT OFFICE 2,607,031

PHASE SHIFTER

Marcel Denis and Pierre Palluel, Paris, France, assignors to Compagnie Generale de Telegraphie Sans Fil, a corporation of France Application June 2, 1950, Serial No. 165,802
In France June 20, 1949

2 Claims. (Cl. 332—7)

This invention relates to phase shifters for ultra short wave oscillators and provides certain improvements in a phase shifter for an ultra short wave oscillator which comprises a travelling wave valve with an outside reaction channel between its output and its input and which is characterised in that the said channel contains a filter designed to select a possible oscillation range on a single mode and a phase shifter for adjusting the phase so as to render this oscillation possible. More specifically the invention provides improved phase shifters for modulating or controlling the frequency of such an oscillator.

According to this invention the phase shifter employed comprises a dielectric substance subjected to an electric field and the required variation of phase is achieved by variation of the dielectric constant of this substance by regulating or varying said electric field.

The invention is based on the fact that certain substances such as earth-alkaline titanate in the crystalline state or agglomerated by a ceramic process, in pure condition or in mixed combinations of variable proportions, exhibit a high dielectric constant which is capable of substantial variation under the action of a varying electric field. The phase velocity of a high frequency wave transversing such a substance thus depends on the applied electric field so that by varying the latter, either by a potentiometer or like control or by superimposing an external signal on the field generating means, variation of tuning or modulation of the frequency of the oscillator may be effected.

Figure 1:
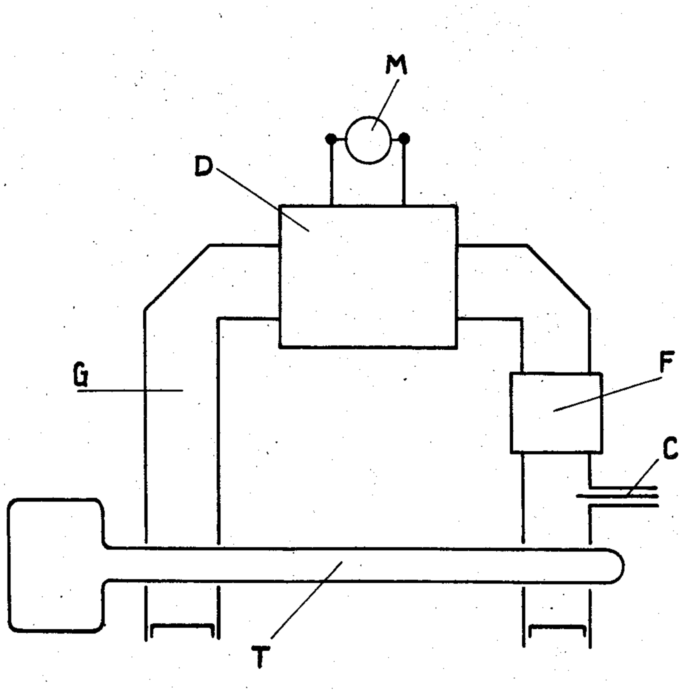

The invention is illustrated in and further explained in connection with the accompanying drawings in which:

Figure 1 shows diagrammatically an installation embodying the invention, and

Figure 2:
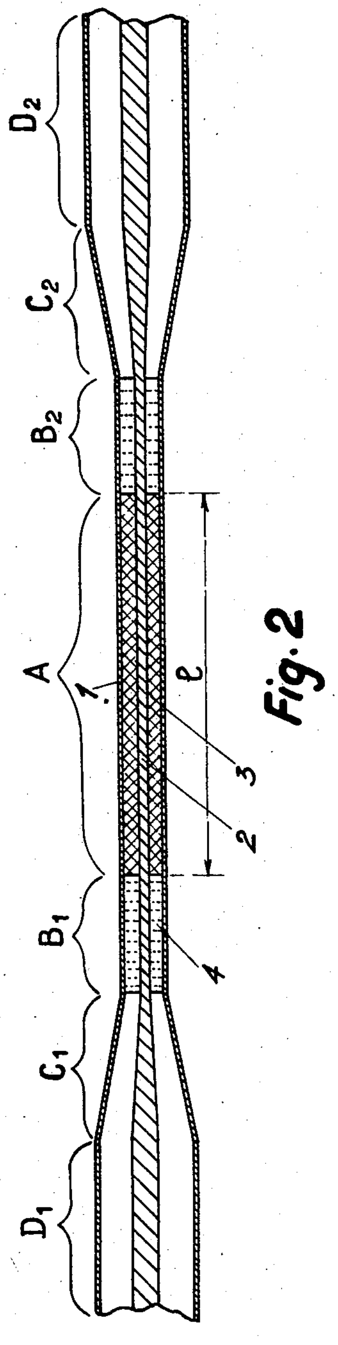
Figure 3:
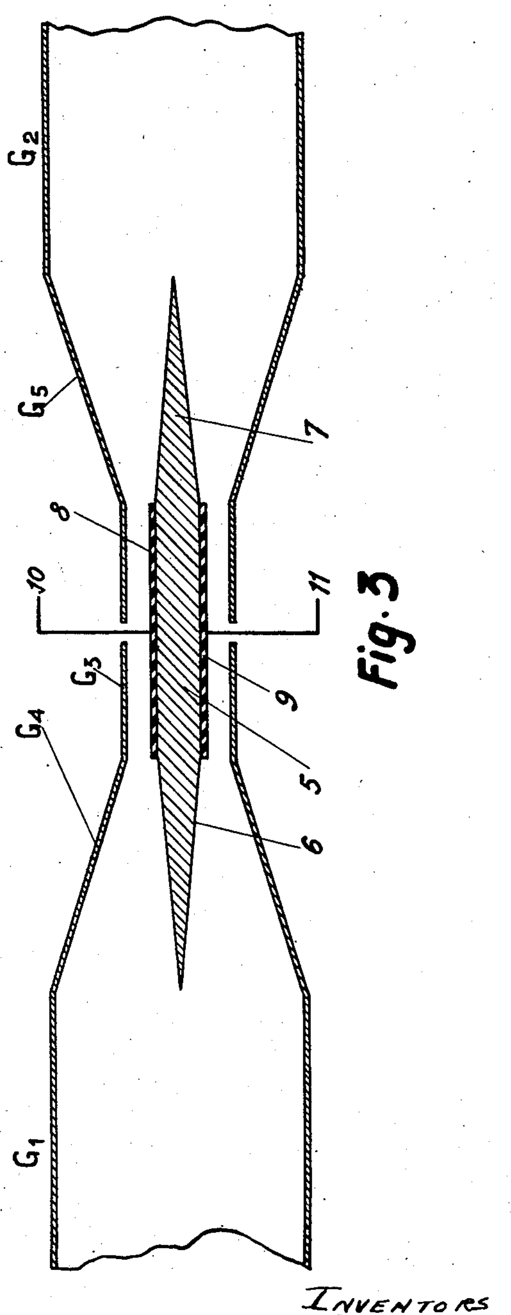

Figures 2 and 3, which show two alternative constructions for the phase shifter.

Referring to Figure 1, which is a purely diagrammatic representation of the oscillator as a whole, T is a travelling wave tube of which the input and output are coupled by a reaction channel G containing a filter F and a phase shifter D. Modulation from a source M controls the phase shift introduced by the phase shifter D, and the modulated energy passes via a filter F into the load circuit through a coupling C.

Figure 2 shows one form which, in accordance with the present invention the phase shifter D may take, it being assumed that the channel G is in the form of a co-axial line. In this figure A represents a section of co-axial phase shifting line comprising an external conductor 1 and an internal conductor 2, the space between these two conductors being filled with a dielectric material 3 of the nature already mentioned herein. The dimensions of the section A must be small enough to ensure that no parasitic mode will be propagated therein. The sections B1 and B2 are transition sections constituted by co-axial lines each a quarter of a wave long at the mean operating frequency and of the same transverse dimensions as section A. These sections are filled with a dielectric material whose constant is the geometric mean between that of the material 3 and that of space. Two co-axial line sections C1 and C2 of progressively increasing section serve to adapt the dimensions of the co-axial line sections B1 and B2 to those of the parts D1 and D2 of the reaction channel.

In this arrangement the modulating voltage is applied to the terminals of the condenser which is constituted by the conductors 1 and 2 of the assembly of co-axial line sections. If required a D. C. voltage may be superposed upon the modulating voltage so as to regulate the mean dielectric constant of the substance 3 to a suitable value. If $l$ is the length of the section A and $v$ is the phase velocity the total phase shift $\varphi o$ is given for a mean value Eo of the dielectric constant is given by:

$$\varphi o=\frac{2\pi 1F}{v}$$

where F is the frequency.

If under the influence of the modulation voltage, Eo varies by $\Delta E$, the variation $\Delta\varphi$ of phase is given by:

$$\Delta\varphi=\frac{2\pi 1F}{v}\,\frac{1}{2}\,\frac{\Delta E}{Eo}=\frac{1}{2}\,\varphi o\frac{\Delta E}{Eo}$$

By pre-determining $\Delta\varphi$ and not varying $\Delta E$ far enough to introduce distortion from the linear law it is possible to deduce $\varphi o$ and consequently 1.

The diameters $d_1$ and $d_2$ of the conductors 1 and 2 respectively are determined by the following requirement which must be satisfied to avoid propagating a parasitic mode:

$$\pi\frac{d_1+d_2}{2}\sqrt{Eo} < \lambda$$

where $\lambda$ is the wave length.

For example if $\lambda=8$ cm., and $Eo=100$ we have $d_1+d_2<0.5$ cm. Supposing $$\frac{d_1}{d_2}=3$$

we may take $d_1=1$ mm. and $d_2=3$ mm.

The characteristic impedance of this co-axial line is:

$$Z_0=\frac{138\log_{10} d_2/d_1}{\sqrt{Eo}}\cong 7 \text{ ohms.}$$

In this way the elements of the system may be completely determined in design and the data necessary for calculating impedance adaptation obtained.

Figure 3 shows an example of phase shift construction adapted to the case where the reaction channel is made up of rectangular guides. Only a section taken parallel to the electric field is shown the section parallel to the magnetic field being of the same appearance except for the dimensions.

The phase shifter is here constituted by a block 5 of dielectric material placed in a restriction G3 of rectangular section inserted between the guide parts G1, G2 of the reaction channel. Perpendicular dimensions of the section of the block are $a$ and $b$ respectively.

Impedance adapting or transition sections of progressively varying cross section are interposed at G4 and G5. The guide section which is filled with dielectric material will exhibit the same characteristic impedance as the guide parts G1 and G2 if the corresponding dimensions are equal respectively to $$\frac{a}{\sqrt{Eo}} \text{ and } \frac{b}{\sqrt{Eo}}$$

The transition between 5 and G1 on the one hand and 5 and G2 on the other is effected by extending the parallelepiped of dielectric material contained in the section G3 by two pyramids 6 and 7. Accordingly waves coming in by G1 are progressively concentrated at 6 without causing reflection and similarly reflection is avoided at the transition between G2 and 7. Thus the waves cannot be propagated between G3 and 5. The block 5 is placed between two insulated half guides 8 and 9; so as to provide a condenser to which the modulation voltage is applied by means of leads 10 and 11 passing through apertures in the guide G3. These current leads do not cause high frequency disturbances because energy is not propagated between G3 and 5.

The invention is not restricted to the particular examples described and illustrated.

We claim:

1. A generating circuit for ultra high frequency waves comprising a travelling wave tube having an input and an output, a feed-back channel coupling the output of the said tube to the input for causing the tube to operate as an oscillator, a phase shifter and a filter, said phase shifter being dimensioned so as to introduce a phase displacement completing the phase displacement along the said feedback channel, up to such a value that the total retrocoupled energy phase displacement between said output and input sustains oscillations in said tube circuit, and said filter being dimensioned so as to select a band of predetermined width in the spectrum of said oscillations, said phase shifter comprising a body of dielectric material whose dielectric constant depends upon the electric field to which it is subjected, said body being arranged to be traversed by the high frequency wave generated by the said generating circuit, a pair of electrodes arranged on opposite sides of said body, and means for applying between said electrodes a voltage which sets up an electric field across the said body, thereby causing the said voltage to vary the phase velocity of the wave traversing the said body, and then to vary the said phase displacement introduced by the said phase shifter.

2. A generating circuit for ultra high frequency waves according to claim 1, in which said means for applying a voltage between said pair of electrodes comprises a source of alternating modulating voltage for modulating the generated ultra high frequency oscillations.

MARCEL DENIS.
PIERRE PALLUEL.

REFERENCES CITED

The following references are of record in the file of this patent:

UNITED STATES PATENTS

| Number | Name | Date |
|---|---|---|
| 2,421,725 | Stewart | June 3, 1947 |
| 2,473,556 | Wiley | June 21, 1949 |
| 2,483,818 | Evans | Oct. 4, 1949 |
| 2,521,760 | Starr | Sept. 12, 1950 |